United States Patent
Go et al.

(10) Patent No.: US 8,175,088 B2
(45) Date of Patent: May 8, 2012

(54) SYSTEM FOR OFFERING MOBILE TELECOMMUNICATION SERVICE USING INTERNET NETWORK WITH UTP CABLE

(75) Inventors: Nam Ok Go, Gyeonggi-do (KR); In Gyeom Kim, Gyeonggi-do (KR); Won Gu Kang, Gyeonggi-do (KR)

(73) Assignee: Nam Ok Go, Gyeonggi-do (KR)

( * ) Notice: Subject to any disclaimer, the term of this patent is extended or adjusted under 35 U.S.C. 154(b) by 412 days.

(21) Appl. No.: 12/518,381

(22) PCT Filed: Jun. 4, 2007

(86) PCT No.: PCT/KR2007/002698
§ 371 (c)(1),
(2), (4) Date: Jun. 9, 2009

(87) PCT Pub. No.: WO2008/072824
PCT Pub. Date: Jun. 19, 2008

(65) Prior Publication Data
US 2010/0014447 A1    Jan. 21, 2010

(30) Foreign Application Priority Data

Dec. 11, 2006 (KR) .................. 10-2006-0125802

(51) Int. Cl.
*H04Q 11/00* (2006.01)
(52) U.S. Cl. ........ 370/386; 370/401; 370/463; 370/487; 370/535; 370/537; 709/249; 709/250
(58) Field of Classification Search .................. 370/312, 370/327, 340, 351, 352, 355, 366, 359, 386–390, 370/401, 463, 487, 490, 493–495, 498, 535–537; 709/249, 250, 253
See application file for complete search history.

(56) References Cited

U.S. PATENT DOCUMENTS

| | | | |
|---|---|---|---|
| 6,393,482 B1 | 5/2002 | Rai et al. | |
| 6,484,213 B1* | 11/2002 | Nouri | 709/249 |
| 6,512,755 B1* | 1/2003 | Deschaine et al. | 370/352 |
| 7,818,480 B2* | 10/2010 | Hoerl et al. | 709/253 |
| 7,961,705 B2* | 6/2011 | Kennedy et al. | 370/389 |
| 2003/0012184 A1* | 1/2003 | Walker et al. | 370/352 |
| 2003/0108032 A1* | 6/2003 | Kato | 370/352 |
| 2005/0027890 A1* | 2/2005 | Nelson et al. | 709/250 |
| 2005/0078690 A1* | 4/2005 | DeLangis | 370/401 |
| 2006/0245373 A1 | 11/2006 | Bajic | |
| 2007/0133521 A1* | 6/2007 | McMaster | 370/352 |

* cited by examiner

*Primary Examiner* — Jeffrey M Rutkowski
(74) *Attorney, Agent, or Firm* — Rabin & Berdo, P.C.

(57) ABSTRACT

Provided is a system for providing mobile telecommunication services using an Internet network built with a UTP cable. The system includes a main unit and a plurality of sub units. The main unit includes a plurality of input ports respectively connected to corresponding distributing ports of the switching hubs through UTP cables, is connected to an external mobile telecommunication base station through a wireless link, combines Internet signals transmitted from the distributing ports of the switching hubs with mobile telecommunication signals transmitted from the mobile telecommunication state through a wireless link. Each sub unit includes an input port connected to corresponding one of the output ports of the main unit through an UTP cable, separates the combined signal from the output port of the main unit into an Internet signal and a mobile telecommunication signal.

5 Claims, 3 Drawing Sheets

[Fig. 1] PRIOR ART
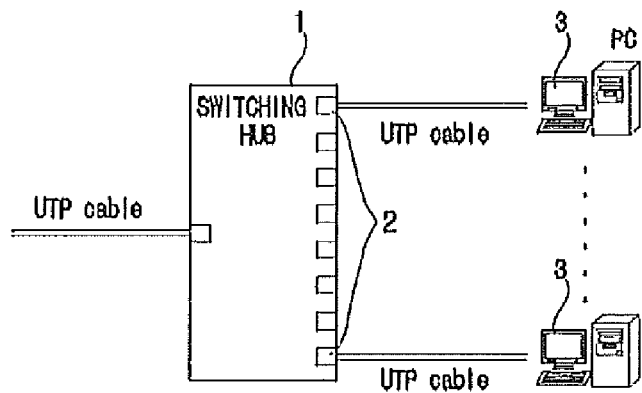
[Fig. 2] PRIOR ART
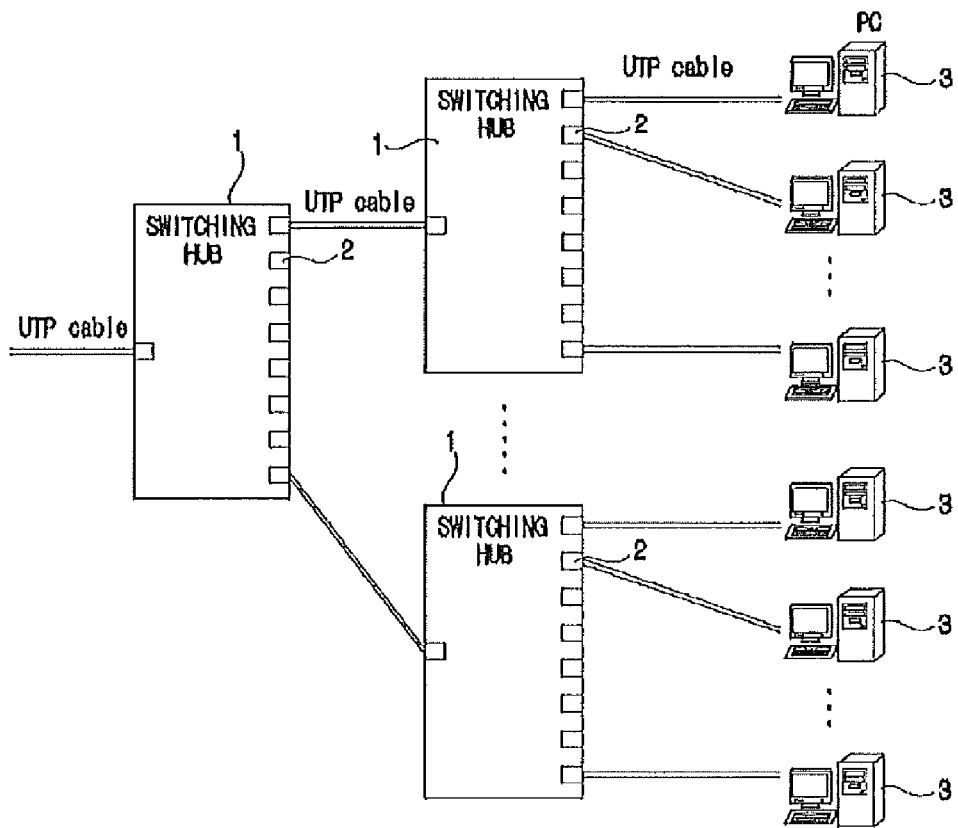

[Fig. 3]
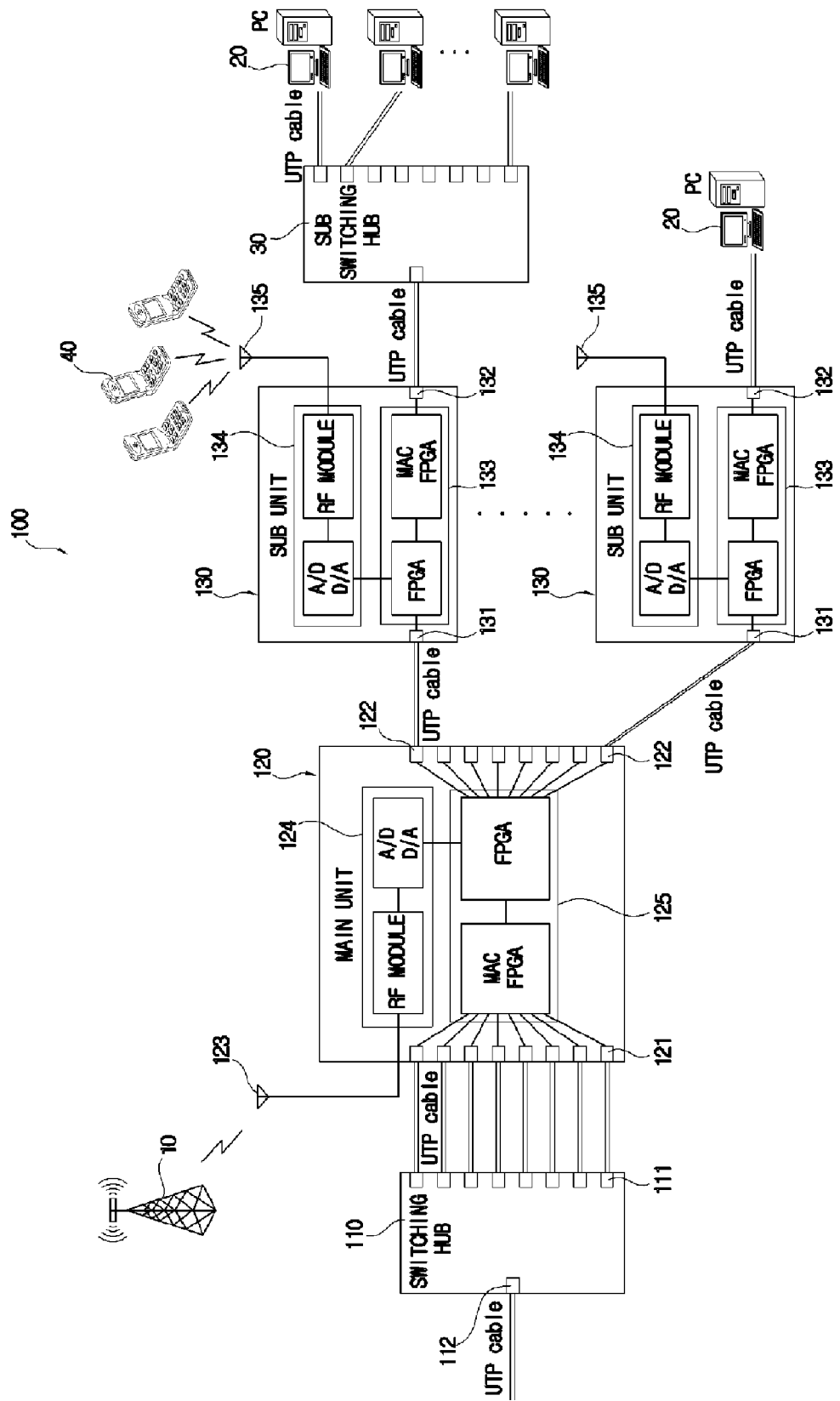

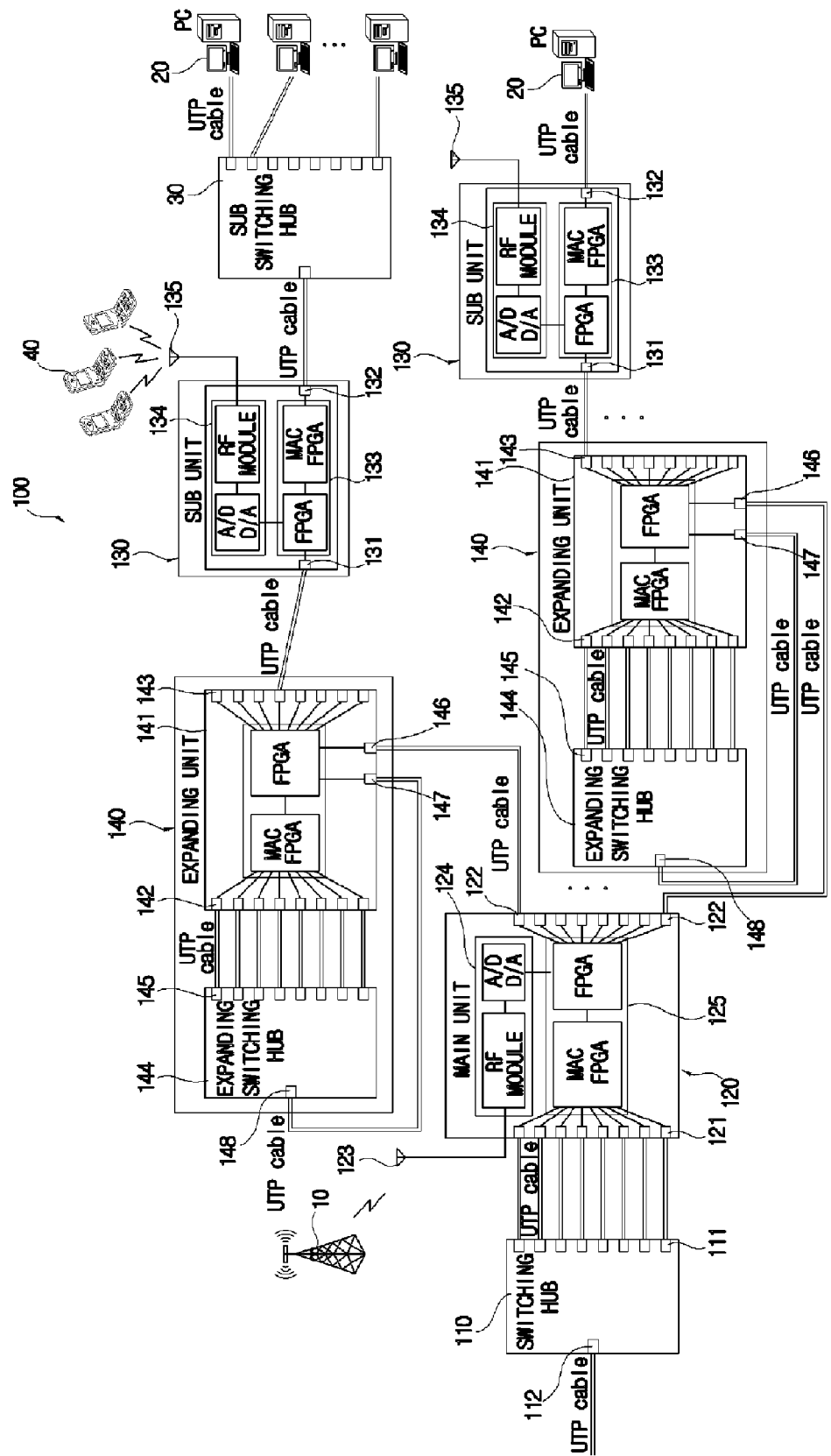
[Fig. 4]

SYSTEM FOR OFFERING MOBILE TELECOMMUNICATION SERVICE USING INTERNET NETWORK WITH UTP CABLE

TECHNICAL FIELD

The present invention relates to a system for providing mobile telecommunication services using an Internet network built with an unshielded twisted pair (UTP) cable and more particularly, to a system for providing not only Internet services but also mobile telecommunication services using an Internet network that was previously built with the UTP cable as it is.

BACKGROUND ART

In general, Internet services are provided to users in a building through switching hubs shown in FIG. 1. As shown in FIG. 1, a switching hub 1 receives Internet signals from external Internet equipment or a central computing system in a building through an unshielded twisted pair (UTP) cable. The switching hub 1 expands and distributes the received Internet signal to personal computers (PC) 3 through UTP cables connected to each of distributing ports of the switching hub 1. Accordingly, a plurality of users in the building can use the Internet signals inputted in the building.

FIG. 2 is a diagram illustrating a network built with a plurality of switching hubs 1. Comparing to FIG. 1, the Internet service can be provided to more users.

As shown, one or a plurality of switching hubs 1 can be installed at each of floors in a building. The number of switching hubs 1 to install at each floor may vary according to an internal structure of a building or the number of Internet users. That is, a plurality of switching hubs can be installed in various forms.

As described above, a conventional Internet service system can provide Internet services to more users through installing more switching hubs connected through a UTP cable. In order to provide mobile telecommunication services as well as the Internet service, however, an optical cable or a coaxial cable additionally needs to be installed in a building for transferring signals received from an external base station.

However, the significant amount of cost and time is needed for installing the optical cable or the coaxial cable at each floor in the building in order to provide mobile telecommunication services. Also, the installed optical cables and coaxial cables defile the appearance of the floors in the building.

DISCLOSURE OF INVENTION

Technical Problem

It is, therefore, an object of the present invention to provide a system for providing not only Internet services but also mobile telecommunication services using an Internet network that was previously built with the UTP cable without additionally installing an optical cable or a coaxial cable.

Technical Solution

In accordance with one aspect of the present invention, there is provided a system for providing mobile telecommunication services using an Internet network built with a UTP (unshielded twisted pair) cable, which includes switching hubs each for receiving Internet signals from external Internet equipment installed in a building through the UTP cable and distributing the received Internet signal using through a plurality of distributing ports, the system including a main unit and a plurality of sub units. The main unit includes a plurality of input ports respectively connected to corresponding distributing ports of the switching hubs through UTP cables, is connected to an external mobile telecommunication base station through a wireless link, combines Internet signals transmitted from the distributing ports of the switching hubs with mobile telecommunication signals transmitted from the mobile telecommunication state through a wireless link, and transmits the combined signal through a plurality of output ports corresponding to the input ports. Each sub unit includes an input port connected to corresponding one of the output ports of the main unit through an UTP cable, separates the combined signal from the output port of the main unit into an Internet signal and a mobile telecommunication signal, transmits the Internet signal to a PC terminal or a sub switching hub connected to a plurality of PC terminals through one output port corresponding to the input port, and transmits the mobile telecommunication signal to an external mobile telecommunication terminal through a wireless link.

A bidirectional communication may be performed through the main unit and the sub units between the switching hub and the PC terminal, or between the mobile telecommunication base station and the mobile telecommunication terminal.

The main unit may include a first antenna, a first converter, and a first signal processor. The first antenna may receive mobile telecommunication signals from the mobile telecommunication base station through a wireless link, and transmit analog signal transmitted from the first converter to the mobile communication base station through a wireless link. The first converter may convert the mobile telecommunication signal received from the first antenna from an analog signal to a digital signal, convert the mobile telecommunication terminal signal from the first signal processor from a digital signal to an analog signal, and transmit the converted signal through the first antenna. The first signal processor may combine the digital mobile telecommunication signal from the first converter and the Internet signal transmitted from each distributing port of the switching hub and transmit the combined signal, and separate a signal transmitted through the sub unit into a mobile telecommunication terminal signal and a PC terminal signal, transmit the mobile telecommunication terminal signal to the first converter, and transmit the PC terminal signal to the switching hub connected to an external Internet equipment.

The sub unit may include a second signal processor, a second converter, and a second antenna. The second signal processor may separate the combined signal transmitted from the first signal processor of the main unit into an Internet signal and a mobile telecommunication signal, transmit the separated signals, and combine a digital signal from a second converter with a PC terminal signal from the PC terminal and transmit the combined signal to a first signal processor. The second converter may convert the mobile telecommunication signal separated at the second signal processor from a digital signal to an analog signal, and convert a mobile telecommunication terminal signal transmitted from the second antenna from an analog signal to a digital signal. The second antenna may transmit the analog mobile telecommunication signal converted at the second converter to the mobile communication terminal through a wireless link, and receive the mobile telecommunication terminal signal from the mobile telecommunication terminal through a wireless link.

The system may further include an expanding unit connected between one of output ports of the main unit and the sub unit through an UTP cable. The expanding unit may include an expanding signal processor for separating the combined signal transmitted from one of the output port of the main unit into an Internet signal and a mobile telecommunication signal and an expanding switching hub for receiving the Internet signal from the expanding signal processor and distributing the received Internet signal to a plurality of expanding ports. The expanding signal processor may include a plurality of signal input ports connected to corresponding expanding ports of the expanding switching hub through an UTP cable, combine an Internet signal transmitted from each of the expanding ports of the expanding switching hub with a mobile communication signal separated at the expanding signal processor, and transmit the combined signal to the sub unit through a plurality of signal output ports corresponding to the signal input port. A bidirectional communication may be performed between the switching hub and the PC terminal or between the mobile telecommunication base station and the mobile telecommunication terminal through the main unit, the expanding unit, and the sub unit.

Advantageous Effects

A system for providing mobile telecommunication services according to an embodiment of the present invention can provide mobile telecommunication services as well as Internet services using an Internet network built with the UTP cable without additionally installing expensive cables such as an optical cable or a coaxial cable. Therefore, a cost, manpower, and a time for installing additional expensive cables can be reduced. Also, the system according to an embodiment of the present invention can be installed through a simple construction process and does not defile the appearance of offices or rooms in the building after installing the system.

BRIEF DESCRIPTION OF THE DRAWINGS

The above and other objects and features of the present invention will become apparent from the following description of the preferred embodiments given in conjunction with the accompanying drawings, in which:

FIG. 1 and FIG. 2 are a diagram illustrating a typical Internet network formed of switching hubs connected through an UTP cable;

FIG. 3 is a diagram illustrating a system for providing mobile telecommunication services using an Internet network built with an UTP cable according to an embodiment of the present invention; and FIG. 4 is a diagram illustrating a mobile telecommunication service system having an expanding unit according to an embodiment of the present invention.

BEST MODE FOR CARRYING OUT THE INVENTION

Other objects and aspects of the invention will become apparent from the following description of the embodiments with reference to the accompanying drawings, which is set forth hereinafter.

Hereinafter, a system for providing mobile telecommunication services using Internet network built with an UTP cable according to an embodiment of the present invention will be described with reference to the accompanying drawings. FIG. 1 and FIG. 2 are a diagram illustrating a typical Internet network formed of switching hubs connected through an UTP cable. FIG. 3 is a diagram illustrating a system for providing mobile telecommunication services using an Internet network built with an UTP cable according to an embodiment of the present invention. FIG. 4 is a diagram illustrating a mobile telecommunication service system having an expanding unit according to an embodiment of the present invention.

The present invention relates to a system for providing mobile telecommunication services using an Internet network built with an UTP cable, which includes switching hubs 110 for receiving Internet signals through an UTP cable from external Internet equipment or a central computing system in a building and distributing the received Internet signals through a plurality of distributing ports 111.

As shown, the system 100 includes a main unit 120 and a sub unit 130.

Referring to FIG. 3, the main unit 120 includes a plurality of input ports 121 connected to corresponding distributing ports 111 of the switching hub 110 through an UTP cable. The main unit 120 is connected to an external mobile telecommunication base station 10 through a wireless link.

The main unit 120 combines Internet signals transmitted from the distributing ports 111 of the switching hub 110 through the UTP cable and mobile telecommunication signals transmitted from the mobile telecommunication base station 10 through a wireless link and transmits the combined signals through a plurality of output ports 112 corresponding to the input ports 121.

Meanwhile, the sub unit 130 includes an input port 131 connected to one of the output ports 122 of the main unit 120 through a UTP cable. The sub unit 130 separates the combined signal transmitted from one of the output ports 122 of the main unit 120 to an Internet signal and a mobile telecommunication signal. The sub unit 130 transmits the Internet signal to the PC 20 through the UTP cable and transmits the mobile telecommunication signal to the mobile telecommunication terminal 40 through a wireless link.

In more detail, the sub unit 130 can transmit the separated Internet signal to a PC terminal 20 or a sub switching hub 30 connected to a plurality of PC terminals 20 through an output port 132 corresponding to the input port 131 of the sub unit 130. Also, the sub unit 130 can transmit the separated mobile telecommunication signal to an external mobile telecommunication terminal 40 through a wireless link.

A plurality of sub units 130 may be disposed corresponding to each of the output ports of the main unit 120.

The mobile telecommunication terminal 40 may be a terminal capable of receiving the mobile telecommunication signal through a wireless link. For example, the mobile telecommunication terminal 40 may include a cellular phone, a personal digital assistant (PDA), and a note book computer.

As described above, the main unit 120 and the sub unit 130 according to the present embodiment enable the users of PC terminals 20 to use not only the Internet service but also the mobile telecommunication service between a mobile telecommunication base station 10 and a mobile telecommunication terminal 40 through the Internet network built with the UTP cable.

In other words, since expensive optical cable or coaxial cable is not needed to be installed in a building for transferring signals received from an external base station, a cable installing cost, manpower, and time can be significantly reduced.

According to the present embodiment, the Internet services and the mobile telecommunication services can be provided through the Internet network built with an UTP cable by simply connecting the main unit 120 and the sub unit 130 to the Internet network built with the UTP cable network. As described above, an installation process of the system for providing the mobile telecommunication service is very simple, and an installation time thereof is much shorter than that of the conventional system needing the optical cable or the coaxial cable. Furthermore, the mobile telecommunication providing system according to the present embodiment does not defile the appearance of offices or rooms in the building unlike the conventional mobile telecommunication providing system needing the optical or coaxial cable.

It is preferable to configure the switching hubs 110 and the PC terminal 20 or the mobile telecommunication base station 10 and the mobile telecommunication terminal 40 to perform bidirectional communication. Such a bidirectional communication can be performed passing through the main unit 120 and the sub unit 130.

In order to perform the bidirectional communication, the main unit 120 includes a first antenna 123, a first converter 124 and a first signal processor 125, and the sub unit 130 includes a second antenna 135, a second converter 134, and a second signal processor 133.

At first, a downlink communication from a server to a client, for example, the switching hub 110 or the mobile telecommunication base station 10 to the PC terminal 20 and the mobile telecommunication terminal 40 will be described hereinafter.

The first antenna 123 of the main unit 120 receives mobile telecommunication signal from the mobile telecommunication base station 10 through a wireless link. Then, the first converter 124 converts the received mobile telecommunication signal from an analog signal to a digital signal.

The first signal processor 125 combines the digital mobile telecommunication signal from the first converter 124 with each Internet signal transferred from each of the distributing ports 111 of the switching hub 110. After combining, the first signal processor 125 transmits the combined signal to the sub unit 130.

The second signal processor 133 of the sub unit 130 separates the combined signal transmitted from the first signal processor 125 of the main unit 120 into the Internet signal and the mobile telecommunication signal. After separating, the second signal processor 133 transmits the Internet signal to the PC terminal 20 and transmits the mobile telecommunication signal to the second converter 134. As described above, the Internet signal may be finally transferred to the PC terminal 20 through the main unit 120 and the sub unit 130 and individually processed at the PC terminal 20.

The second converter 134 receives the mobile telecommunication signal separated from the second signal processor 133 and converts the received mobile telecommunication signal from a digital signal to an analogue signal. The second antenna 135 transmits the analogue mobile telecommunication signal from the second converter 134 to the mobile telecommunication terminal 40 through a wireless link. Such a mobile communication signal may be finally transmitted to the mobile telecommunication terminal 40 through the sub unit 130 and the main unit 120 and individually processed at the mobile telecommunication terminal 40.

Hereinafter, an uplink communication from a client to a server, for example, from the PC terminal 20 or the mobile communication terminal 40 to the switching hub 110 or the mobile communication base station 10 will be described.

The second antenna 135 receives a mobile telecommunication terminal signal from the mobile telecommunication terminal 40. The second converter 134 converts the received mobile telecommunication terminal signal from the second antenna 135 from an analog signal to a digital signal. Herein, the mobile telecommunication terminal signal may be a signal modified by a user of the mobile telecommunication terminal 40.

The second signal processor 133 combines the digital mobile telecommunication terminal signal from the second converter 134 with a PC terminal signal transmitted from the PC terminal 20. Then, the second signal processor 133 transmits the combined signal to the first signal processor 125. Such a PC terminal signal may be identical to a signal modified by a user of the PC terminal 20.

The first signal processor 125 separates the mobile telecommunication terminal signal and the PC terminal signal, which are transferred through the second signal processor 133 of the sub unit 130. Then, the first signal processor 125 transfers the mobile telecommunication terminal signal to the first converter 124 and the PC terminal signal to the switching hub 110.

The PC terminal signal from the PC terminal 20 may be finally transmitted to external Internet equipment or a central computing system in a building through the sub unit 130, the main unit 120, and the switching hub 110, and processed at the external Internet equipment or the central computing system, individually.

The first converter 124 converts the mobile telecommunication terminal signal from the first signal processor 125 from a digital signal to an analogue signal, and transfers the analog mobile telecommunication terminal signal to the first antenna 123. The first antenna 123 transmits the analog mobile telecommunication terminal signal to the mobile telecommunication base station 10 through a wireless link. Such an analog mobile telecommunication terminal signal may finally transferred to the mobile telecommunication base station 10 through the sub unit 130 and the main unit 120, and individually processed in the mobile telecommunication base station 10.

As shown in FIG. 4, the system 100 for providing mobile telecommunication services according to the present embodiment may further include an expanding unit 140 connected between one of the output ports 122 of the main unit 120 and the single input port 131 of the sub unit 130 through an UTP cable. The expanding unit 140 includes an expanding signal processor 141 and an expanding switching hub 144.

The expanding signal processor 141 receives the combined signal transmitted from one of the output ports 122 of the main unit 120 through a sub input port 146 and separates the combined signal into the Internet signal and the mobile telecommunication signal. The separated Internet signal is additionally outputted to the sub output port 147.

The expanding switching hub 144 receives the Internet signal separated and outputted from the expanding signal processor 141 using an expanding input port 148 through an UTP cable, and distributes the received Internet signal to a plurality of expanding ports 145.

Herein, the expanding signal processor 141 includes a plurality of signal input ports 142 respectively connected to the expanding ports 145 of the expanding switching hub 144 through an UTP cable. The expanding signal processor 141 combines individual Internet signal transferred from each expanding port 145 of the expanding switching hub 144 with a mobile telecommunication signal separated from the expanding signal processor 141. After combining, the expanding signal processor 141 transmits the combined signal to the sub unit 130 through a plurality of signal output ports 143 corresponding to the signal input port 142

As described above, the expanding unit 140 shown in FIG. 4 may be additionally or selectively installed in the building when it is necessary to expand in order to provide the Internet service and the mobile telecommunication service in the building, for example, if the building is a multistory building or a large office building.

When the expanding unit 140 is disposed, it is preferable to perform bidirectional communication between the switching hub 110 and the PC terminal 20, or between the mobile telecommunication base station 10 and the mobile telecommunication terminal 40. The bidirectional communication may be performed through the main unit 120, the expanding unit 140, and the sub unit 130.

That is, in case of an uplink communication from the PC terminal 20 and the mobile communication terminal 40 to the switching hub 110 and the mobile telecommunication base station 10, the expanding signal processor 141 can separate the mobile telecommunication terminal signal and the PC terminal signal, which are transmitted passing through the sub unit 130, and transmit the separated signals to the expanding switching hub 144. The expanding signal processor 141 can combine the PC terminal signal outputted from the expanding switching hub 144 with the separated mobile telecommunication terminal signal and transmit the combined signal to the main unit 120.

The main unit 120 and the sub unit 130 may be connected through a gigabit Ethernet. For example, a data transmit rate of about 600 Mbps (=12 bits×50 MHz) may be assigned to transmit the mobile telecommunication signal, and a data transmit rate of about 400 MHz (=1 Gbps-600 Mbps) may be assigned to transmit the Internet signal if 12-bit data can be transmitted per a sampling rate of about 50 MHz under an network environment of 1 Gbps data transmit rate.

Such data transmit rates are only described for examples. The data transmit rates may vary.

While the present invention has been described with respect to certain preferred embodiments, it will be apparent to those skilled in the art that various changes and modifications may be made without departing from the scope of the invention as defined in the following claims.

The invention claimed is:

1. A system for providing mobile telecommunication services using an Internet network built with a first UTP (unshielded twisted pair) cable, which includes switching hubs each having a plurality of distributing ports, each switching hub receiving Internet signals from external Internet equipment installed in a building through the first UTP cable and distributing the received Internet signals through the plurality of distributing ports, the system comprising:

a main unit including a plurality of input ports respectively connected to corresponding distributing ports of the switching hubs through second UTP cables, and a plurality of output ports corresponding to the input ports, the main unit being connected to an external mobile telecommunication base station through a first wireless link, the main unit combining a downstream Internet signal transmitted from the distributing ports of the switching hubs with a downstream mobile telecommunication signal transmitted from the mobile telecommunication base station through the first wireless link to generate a downstream combined signal, and transmitting the downstream combined signal through the plurality of output ports corresponding to the input ports; and a plurality of sub units each
including an input port connected to a corresponding one of the output ports of the main unit through a third UTP cable, and an output port corresponding to the input port of each sub unit,
separating the downstream combined signal transmitted from the corresponding output port of the main unit into the downstream Internet signal and the downstream mobile telecommunication signal,
transmitting through the output port thereof the separated downstream Internet signal to a respective PC terminal connected to each sub unit or to a respective sub switching hub connected between each sub unit and a plurality of PC terminals, and
transmitting the separated downstream mobile telecommunication signal to a respective external mobile telecommunication terminal through a respective wireless link.

2. The system of claim 1, wherein a bidirectional communication is performed through the main unit and the sub units between the switching hub and a particular PC terminal, or between the mobile telecommunication base station and a particular mobile telecommunication terminal.

3. The system of claim 2, wherein the downstream mobile telecommunication signal transmitted from the mobile telecommunication base station is an analog signal, and wherein the main unit includes:

a first antenna for
receiving the downstream mobile telecommunication signal from the mobile telecommunication base station through the first wireless link, and
transmitting analog signals upstream to the mobile communication base station through the first wireless link;

a first converter for
converting the downstream mobile telecommunication signal received from the first antenna to a first digital signal, and
converting an upstream digital mobile telecommunication terminal signal to a first analog signal, and transmitting the first analog signal through the first antenna; and a first signal processor for
combining the first digital signal from the first converter and the downstream Internet signal transmitted from each distributing port of the switching hub to generate the downstream combined signal and transmitting the downstream combined signal to each sub unit, and
receiving an upstream combined signal from a particular one of the sub units, separating the received upstream combined signal into the upstream digital mobile telecommunication terminal signal and an upstream PC terminal signal, transmitting the separated upstream digital mobile telecommunication terminal signal to the first converter, and transmitting the separated upstream PC terminal signal to the switching hubs connected to the external Internet equipment.

4. The system of claim 3, wherein the separated downstream mobile telecommunication signal is a digital signal, the particular sub unit receives an upstream analog mobile telecommunication terminal signal from the particular mobile telecommunication terminal through a second wireless link and converts the received upstream analog mobile telecommunication terminal signal to the upstream digital mobile telecommunication terminal signal, and the particular sub unit receives an upstream digital PC terminal signal from the particular PC terminal, and wherein the particular sub unit includes:

a second signal processor for
separating the downstream combined signal transmitted from the first signal processor of the main unit into the separated downstream Internet signal and the separated downstream mobile telecommunication signal, and
combining the upstream digital mobile telecommunication terminal signal with the received upstream digital PC terminal signal to generate the upstream combined signal and transmitting the upstream combined signal to the first signal processor;

a second converter for
    converting the downstream mobile telecommunication signal separated at the second signal processor to a second analog signal, and
    converting the upstream analog mobile telecommunication terminal signal received from the particular mobile telecommunication terminal to the upstream digital mobile telecommunication terminal signal; and
a second antenna for
    transmitting the second analog signal to the mobile communication terminal through the second wireless link, and
    receiving the upstream analog mobile telecommunication terminal signal from the particular mobile telecommunication terminal through the second wireless link.

5. The system of claim 1, further comprising an expanding unit connected between a particular one of the output ports of the main unit and a corresponding one of the sub units through a fourth UTP cable, wherein the expanding unit includes:
    an expanding signal processor for separating the downstream combined signal transmitted from the particular output port of the main unit into the separated downstream Internet signal and the separated downstream mobile telecommunication signal; and
    an expanding switching hub having a plurality of expanding ports, for receiving the separated downstream Internet signal from the expanding signal processor and distributing the received separated downstream Internet signal to the plurality of expanding ports,
wherein the expanding signal processor includes a plurality of signal input ports connected to corresponding expanding ports of the expanding switching hub through a fifth UTP cable, and a plurality of signal output ports corresponding to the signal input ports, and
the expanding signal processor combines the respective downstream Internet signal transmitted from each of the expanding ports of the expanding switching hub with the downstream mobile communication signal separated at the expanding signal processor to generate a respective downstream combined signal, and transmits one of the generated downstream combined signals from the expanding ports to the corresponding sub unit through a corresponding one of the plurality of signal output ports of the expanding signal processor, and
wherein a bidirectional communication is performed between the switching hub and a particular PC terminal or between the mobile telecommunication base station and a particular mobile telecommunication terminal through the main unit, the expanding unit, and the corresponding sub unit.

* * * * *